United States Patent [19]

Sobajima et al.

[11] Patent Number: 4,603,153

[45] Date of Patent: Jul. 29, 1986

[54] GLASS FIBER REINFORCED RESIN COMPOSITION

[75] Inventors: Yoshihiro Sobajima; Yukihiko Ichikawa, both of Mie, Japan

[73] Assignee: Mitsubishi Petrochemical Co., Ltd., Tokyo, Japan

[21] Appl. No.: 617,440

[22] Filed: Jun. 5, 1984

[30] Foreign Application Priority Data

Jun. 8, 1983 [JP] Japan ................ 58-102199
Apr. 5, 1984 [JP] Japan ................ 59-68230

[51] Int. Cl.$^4$ .................. C08K 9/06; C08K 7/14; C08K 3/34

[52] U.S. Cl. .................. 523/209; 523/200; 523/205; 523/213; 523/214; 523/217; 524/449; 524/451; 524/456; 524/494

[58] Field of Search ............... 523/200, 213, 214, 205, 523/217, 209; 524/494, 451, 449, 456

[56] References Cited

U.S. PATENT DOCUMENTS

| | | | |
|---|---|---|---|
| 3,766,135 | 10/1973 | Yamanouchi et al. | 523/209 |
| 3,969,313 | 7/1976 | Aishima et al. | 523/202 |
| 3,997,503 | 12/1976 | Henman et al. | 523/214 |
| 4,082,720 | 4/1978 | Henman et al. | 524/504 |
| 4,147,707 | 4/1979 | Alewelt et al. | 523/214 |
| 4,358,502 | 11/1982 | Dunbar | 523/214 |
| 4,426,469 | 1/1984 | Marzola et al. | 524/584 |
| 4,467,061 | 8/1984 | Yamamoto et al. | 524/528 |

FOREIGN PATENT DOCUMENTS

| | | | |
|---|---|---|---|
| 0090036 | 6/1982 | Japan | 523/213 |
| 0019347 | 2/1983 | Japan | 523/214 |
| 2111071 | 6/1983 | United Kingdom | |

OTHER PUBLICATIONS

Derwent Abstract 15670 y/09 (Jan. 1977) Mitsu Pet. J52008054.
Derwent Abstract 83-780672/40 (8-1983) Ube Indust J58145750.
Derwent Abstract 40513k/17 (3-1983) Dainippon Ink J58047002.
Derwent Abstract 64806d/36 (7-1981) Mitsubishi Pet. J56088447.
Derwent Abst. 84-014323/03 (5-1982) Ube J58206659.

*Primary Examiner*—Herbert J. Lilling
*Attorney, Agent, or Firm*—Sughrue, Mion, Zinn, Macpeak, and Seas

[57] ABSTRACT

A glass fiber reinforced resin composition is described, comprising the following components: (a) 30 to 98 parts by weight of a crystalline propylene polymer; (b) 2 to 30 parts by weight of a glass fiber having an average diameter of $10\mu$ or less, the amount of a binder deposited being from 0.01 to 0.3% by weight; (c) 0 to 35 parts by weight of an ethylene-based rubber; (d) 0 to 30 parts by weight of at least one inorganic filler selected from talc, mica, calcium silicate and glass powder; and (e) 0 to 10 parts by weight per 100 parts by weight of the sum of the components (a) to (d) of a pigment comprising a coloring component and a dispersing component, the proportion of a coloring matter or matters having a Mohs hardness of 3.5 or more in the coloring component being less than 30% by weight. This composition is superior in high temperature stiffness, appearance, and pelletizability, and is satisfactory in an amount of warp of article or re-heating warp, and impact strength.

31 Claims, No Drawings

GLASS FIBER REINFORCED RESIN COMPOSITION

FIELD OF THE INVENTION

The present invention relates to a glass fiber reinforced resin composition and more particularly to a glass fiber reinforced resin composition comprising a crystalline propylene polymer, a specific glass fiber and, in some cases, further a rubber, an inorganic filler and a pigment, which is superior in high temperature stiffness, appearance and pelletizability and, furthermore, is satisfactory in warp (including re-heating warp) of article and impact strength.

BACKGROUND OF THE INVENTION

Many attempts have been made to increase physical properties such as high temperature stiffness, mechanical strength and creep resistance of a crystalline propylene polymer by compounding a glass fiber to the propylene polymer.

These glass fiber reinforced propylene polymers (hereinafter sometimes abbreviated to "FRPP"), however, have several defects. For example, (1) a characteristic silver streak-like pattern is formed on injection molded articles, for example, and thus their appearance is not satisfactory, (2) molded articles are subject to warp due to orientation of the glass fiber and a difference in degree of shrinkage between the glass fiber and propylene polymer, and so forth, and (3) when a coloring material is compounded, the resulting polymer composition is inferior in mechanical strength, pelletizability, appearance, scratch resistance, warp of article, and so forth. Thus, conventional FRPP are limited in their application for the fabrication of wide variety of products, for example, in their use as interior or exterior parts for cars.

In order to overcome the above-described problems, various methods have been proposed. In connection with the problems (1) and (3) as described above, an attempt to increase flow properties has been made. However, there has not been obtained a satisfactory resin composition. Thus it has been forced to regulate the amount of the glass fiber to be added. For the problem (2), it has been proposed to utilize a plate-like filler and a rubber-like material (see, for example, Japanese Patent Application (OPI) Nos. 136736/76 and 8054/77 (the term "OPI" as used herein means a "published unexamined Japanese patent application")). Utilization of such fillers or materials, however, gives rise to problems such as a reduction of high temperature stiffness and an increase in density.

SUMMARY OF THE INVENTION

The present invention is intended to overcome the above-described problems of the prior art. And the object of the present invention is to provide a glass fiber reinforced resin composition which is greatly improved in high temperature stiffness, appearance and pelletizability and, furthermore, which is satisfactory in warp of article and impact strength.

It has been found that the object is attained by compounding to a crystalline propylene polymer a specific glass fiber and, in some instances, further a rubber, an inorganic filler and a pigment.

The present invention relates to a glass fiber reinforced resin composition comprising the following components (a) to (e):

(a) 30 to 98 parts by weight of a crystalline propylene polymer;

(b) 2 to 30 parts by weight of a glass fiber in which the average diameter is $10\mu$ or less and the amount of a binder deposited is from 0.01 to 0.3% by weight;

(c) 0 to 35 parts by weight of an ethylene copolymer rubber;

(d) 0 to 30 parts by weight of at least one inorganic filler selected from the group consisting of talc, mica, calcium silicate and glass powder; and (e) 0 to 10 parts by weight per 100 parts by weight of the sum of the components (a), (b), (c) and (d) of a pigment in which coloring matters having a Mohs hardness of 3.5 or more constitute less than 30% by weight of the coloring component (excluding the dispersing component).

DETAILED DESCRIPTION OF THE INVENTION

The composition of the present invention is superior in the above-described physical properties and, furthermore, is good in weld strength, scratch resistance and also in dimensional stability under high temperature conditions. Thus the composition of the present invention is suitable for use in the production of industrial parts for which high performance is required, such as large-sized car parts (e.g., an instrument panel, a spoiler, a fender, and a fan shroud), and various types of electric appliance parts.

The components (a) to (e) of the composition of the present invention will hereinafter be explained in detail.

The component (a) is a crystalline propylene polymer having stereoregularity. This crystalline propylene polymer includes a homopolymer of propylene (polypropylene), and block, random or graft copolymers from a major proportion of propylene and one or more monomers, such as other α-olefins (e.g., ethylene, butene, pentene, hexene, heptene, 4-methylpentene, 3-methylbutene, and octene), vinyl esters (e.g., vinyl acetate), aromatic vinyl monomers (e.g., styrene), and vinyl silanes (e.g., vinyltrimethoxysilane and vinyltrimethylsilane). These polymers have an isotactic index (I.I.), a value indicating crystallinity, of at least 40. Polymers having an I.I. of 60 or more are preferred. Especially preferred are those polymers having an I.I. of 75 or more. Polymers having an I.I. of less than 40 are deficient in stiffness.

For the composition of the present invention to have improved fluidity at the time of molding, the melt flow rate (MFR) of the propylene polymer is usually from about 0.01 to about 200g/10 min and preferably from 0.3 to 120 g/10 min. The melt flow rate of the propylene polymer may be regulated or adjusted by suitably selecting polymerization conditions or by applying a suitable post-treatment such as a treatment using peroxides. If the melt flow rate is less than 0.01 g/10 min, the resulting composition is poor in moldability and can provide only an article with an appearance which is not satisfactory. On the other hand, if the melt flow rate is in excess of 200g/10 min, the composition can provide only an article having an insufficient impact strength. The melt flow rate is measured herein according to JIS-K 7210 (230° C., 2.16 kg load).

Propylene polymers as described above can be used singly or in combination with each other in any suitable proportions.

These propylene polymers are prepared by polymerizing propylene or propylene and other monomers in the presence of a so-called Ziegler-Natta catalyst. The propylene polymer as used herein may be suitably selected from commercially available propylene polymers.

Of the above-described propylene polymers, polypropylene and a propylene-ethylene random or block copolymer are preferably used in the present invention. The former polypropylene is suitable for use in cases where, in particular, high temperature stiffness is of significance, and the latter propylene-ethylene copolymer, in cases where it is required for the high temperature stiffness and impact strength to be well balanced. Most preferred is a propylene-ethylene block copolymer in which the ethylene content is from 1 to 25% by weight, particularly from 2 to 20% by weight, the cold xylene-soluble portion content is from 3 to 30% by weight, particularly from 4 to 25% by weight, and the ethylene content of the cold xylene-soluble portion is from 20 to 60% by weight, particularly from 25 to 50% by weight.

The ethylene content is measured herein by the usual procedure utilizing the combination of infrared spectral analysis and nuclear magnetic resonance (NMR) analysis. The cold xylene-soluble portion content is measured as follows:

Two grams of a sample is soaked in 600 ml of boiling xylene for 20 minutes, cooled to room temperature, filtered off by the use of a G 4-type glass filter, and dried. Based on the weight of the solids thus obtained, the cold xylene-soluble portion content is determined.

If the ethylene content of the propylene-ethylene block copolymer is 1% by weight or more, the resulting composition is superior in impact resistance, whereas if it is 25% by weight or less, the resulting composition is greatly superior in stiffness. Compositions containing a propylene-ethylene copolymer having a cold xylene-soluble portion content of 3% by weight or more are preferred from a viewpoint of high impact resistance, whereas those compositions containing a propylene-ethylene copolymer having a cold xylene-soluble portion content of 30% by weight or less are greatly superior in scratch resistance and high temperature stiffness. Furthermore, if the ethylene content of the cold xylene-soluble portion is 20% by weight or more, the resulting composition is superior in impact resistance, whereas if it is 60% by weight or less, the resulting composition is greatly superior in high temperature stiffness and warp of article.

The effect of the present invention is highly exhibited when, as the crystalline propylene polymer, polymers at least partially modified with unsaturated organic acids or their derivatives, the amount of the modifying agent being from 0.01 to 20% by weight, are used. Thus it is preferred in the present invention to use such modified propylene polymers.

Unsaturated organic acids or their derivatives which can be used as the modifying agents include unsaturated organic acids such as acrylic acid, methacrylic acid, maleic acid and itaconic acid, unsaturated organic acid anhydrides such as maleic anhydride, itaconic anhydride and citraconic anhydride, unsaturated organic acid esters such as methyl acrylate and monomethyl maleate, unsaturated organic acid amides such as acrylic acid amide and fumaric acid amide, and unsaturated organic acid imides such as itaconic acid imide.

In modification of the crystalline propylene polymer, 0.01 to 20 parts by weight of the modifying agents per 100 parts by weight of the propylene polymer are used, and the propylene polymer is modified by the graft reaction process. Especially preferred are those polymers modified with acrylic acid or maleic anhydride. This modification is effective in increasing properties such as high temperature stiffness, dimensional stability, and creep resistance.

In the practice of the modification, to increase a degree of modification, organic peroxides such as benzoyl peroxide, lauroyl peroxide, dicumyl peroxide, and tert.-butyl hydroperoxide are used. The amount of the organic peroxide added is usually from 0.001 to 3.0 parts by weight per 100 parts by weight of the propylene polymer.

The modified propylene polymer can be prepared in any suitable manner. For example, a crystalline propylene polymer, an unsaturated organic acid or its derivative, and an organic peroxide are compounded and fully mixed, and then melted and kneaded at a temperature higher than the melting point of the propylene polymer, usually from 170° to 260° C. for 0.2 to 15 minutes. In this case, part or all of the component (c) as described hereinafter may be kneaded at the same time. This results also in modification of the component (c), causing to increase the impact strength of the composition and to reduce the amount of the warp or re-heating warp of article.

The modified propylene polymer as used herein is sufficient to be such that at least part of it is modified. Thus, for example, mixtures of one or more highly modified propylene polymers and one or more propylene polymers (not modified) can be used in the present invention; rather, the use of such mixtures is preferred in that the concentration of the modifying agent can be easily controlled. In this case, the propylene polymer for the modified propylene polymer and the unmodified propylene polymer are not always required to be the same and may be the same or different. By suitably selecting the type of the propylene polymers, there can be obtained a composition having the desired quality. For example, when polypropylene is used as the unmodified propylene polymer, the resulting composition is superior in stiffness, and when a propylene-ethylene block copolymer is used as the unmodified propylene polymer, there can be obtained a composition which is well balanced in stiffness and impact resistance.

The component (b) of the present invention is a glass fiber, and the average diameter of the glass fiber is 10$\mu$ or less and preferably from 2 to 10$\mu$. Furhermore, the amount of the binder (including a binding component to be used for the purpose of sizing and a surface treating agent to be used for the purpose of increasing adhesion properties and compatibility with resins) being deposited onto the surface of the glass fiber is from 0.01 to 0.3% by weight (as determined after the drying process). Glass fibers having the diameter of 9$\mu$ or less, especially 7$\mu$ or less are preferred in that the physical balance (high temperature stiffness and impact strength) can be more improved and the amount of the warp or re-heating warp can be more reduced.

The method of production of the glass fiber as used herein is not critical, and it can be produced in any suitable manner. For example, the glass fiber can be produced as follows:

Glass is melted and molded into glass beads of given size, which are called marbles. These marbles are softened by heating in a fiber-drawing furnace called a bushing and are allowed to flow down through a number of nozzles formed in the furnace table. These fibers are drawn at a high speed, introduced into a binder-coating apparatus where it is coated with the binder by soaking therein and, thereafter, bundled, dried and wound around a rotary drum. The average diameter of the glass fiber is controlled to the predetermined level by regulating conditions such as the size of nozzles, the speed of drawing, and the atmosphere and temperature of the drawing process. At the same time, by regulating the concentration of the binder, the type of the binder, the coating time, and so forth, the amount of the binder deposited on the surface of the glass fiber (as determined after drying) is controlled to from 0.01 to 0.3% by weight.

The length of the glass fiber is not critical and can vary over a wide range. The glass fiber may take any desired form such as rovings, chopped strands, and strands. From a viewpoint of workability to mix with the propylene polymer, it is preferred to use chopped strands of length about 1 to 8 mm. In this case, the number of strands bundled is usually from 100 to 5,000 and preferably 500 to 2,000. As long as the final average length after kneading with the propylene polymer is 0.1 mm or more, so-called milled fiber and glass powder resulting from pulverization of strands can be used. In addition, the glass fiber may be in the form of slivers prepared from continuous monofilaments. The composition of a starting glass material for use in the production of the glass fiber is preferably non-alkali. A typical example is an E-glass.

The glass fiber of the present invention is greatly reduced in the amount of the binder deposited while suitably balancing converging properties and splitting properties. This is one of the reasons for which the effect of the present invention is efficiently obtained.

The average diameter is determined by measuring under an electron microscope, for example. The amount of the binder deposited is determined as an ignition loss. This ignition is carried out under conditions of temperature 600° C. and 60 minutes.

If the average diameter of the glass fiber is in excess of $10\mu$, the degree of increase in mechanical strength is small and further the amount of the warp or re-heating warp increases. If the amount of the binder deposited is in excess of 0.3% by weight, pelletizability and the appearance of the final article are undesirably reduced.

The binder to be used in the glass fiber of the present invention need not contain a surface-treating agent. Usually, however, it contains, for example, coupling agents such as silane-, chromium-, and titanium-group ones. Among these coupling agents, it is preferred to use silane coupling agents such as epoxy silanes (e.g., γ-glycidoxypropyltrimethoxysilane), vinyl silanes (e.g., vinyltrichlorosilane), and aminosilanes (e.g., γ-aminopropylsilane). Simultaneous application of a treatment with surface active agents, such as nonionic, cationic and anionic surface active agents and a treatment with dispersing agents such as fatty acids, metallic soaps and various resins is preferred from a viewpoint of increasing the mechanical strength and pelletizability.

The final content of the binder in terms of the ratio of the binder to the surface-treating agent is not critical. When, however, the ratio is from 20:80 to 80:20, a composition can be obtained in which the mechanical strength, pelletizability, and appearance of mold are relatively well balanced.

The binder is usually composed of a film-forming agent, a surface active agent, a softening agent, an antistatic agent, a lubricant, etc., but it may be composed of modified or unmodified polyolefins alone.

The component (c), ethylene copolymer rubber, which is, if desired, used in the composition of the present invention, includes an ethylene-propylene copolymer rubber, an ethylene-propylene-diene terpolymer rubber, and an ethylene-butene-1-copolymer rubber. Preferably the ethylene content is from 90 to 40% by weight and the Mooney viscosity, $ML_{1+4}$ (100° C.), is from about 5 to about 120.

The ethylene copolymer rubber may be modified in advance with unsaturated organic acids or their derivatives. The ethylene copolymer rubber is effective in increasing the impact strength, in reducing the amount of the warp or re-heating warp, and in increasing dimensional stability.

The component (d), inorganic filler, which is, if desired, used in the composition of the present invention, is at least one material selected from talc, mica, calcium silicate, and glass powder (including milled fiber). This filler may or may not be subjected to a surface treatment in advance. This surface treatment includes a chemical or physical surface treatment using various treating agents such as silane coupling agents, higher fatty acids, fatty acid metal salts, unsaturated organic acids, organotitanates, resin acids, and polyethylene glycols. The surface treatment contributes to the effect of the present invention and, furthermore, is effective in improving the weld strength, coating properties, and mold workability.

The average particle size of talc is from 0.2 to $10\mu$ and preferably from 0.2 to $5\mu$. The average particle size of mica is from 1 to $150\mu$ and preferably from 2 to $50\mu$. Among micas, white mica (muscovite) is particularly preferred. The average particle size of calcium silicate is from 1 to $15\mu$ and preferably from 2 to $10\mu$. It is preferred for the glass powder to have an average particle diameter of $13\mu$ or less, and a length of from 5 to $300\mu$, and to be shaped into particle, scale-like, and fiber forms. This inorganic filler increases high temperature stiffness and, furthermore, is effective in more reducing the amount of the warp and in increasing dimensional stability.

The particle size and length are measured under an electron microscope.

The component (e), which is, if desired, used in the composition of the present invention, is a specific pigment in which coloring matters having a Mohs hardness of 3.5 or more constitute less than 30% by weight of the coloring component (excluding the dispersing component). Pigments are usually composed of the dispersing component and coloring component. The pigment as used herein is as defined above. It is preferred that the amount of coloring matters having a Mohs hardness of 3.5 or more be less than 15% by weight, with the range of less than 5% by weight being particularly preferred.

The pigment may be either organic or inorganic, or either natural or synthetic, and can be prepared in any suitable manner.

Typical examples of coloring matters having a Mohs hardness of 3.5 or more include titanium oxide, white carbon (finely powdered silicic acid), iron oxides (e.g., red oxide, yellow iron oxide, and iron black), iron powder, and steel powder. Typical examples of coloring matters having a Mohs hardness of less than 3.5 include zinc sulfide, zinc oxide, lead white, quinacridone red, perylene red, alizarine lake, polyazo red, lemon chrome, yellow lead, Isoindolinone Yellow, Benzidine Yellow, Quinophthalone Yellow, carbon black, aniline black, Phthalocyanone Blue, calcium carbonate, talc, aluminum powder, copper powder, and silver powder. These coloring matters can be used after applying a surface treatment. They can be used singly or in combination with each other.

The pigment need not contain a so-called dispersing agent but usually contains 5 to 95% by weight of a dispersing agent. As these dispersing agents, metallic soaps, various types of resins, surface active agents, and the like can be used. Typical examples of such dispersing agents are metal (e.g., calcium, magnesium, aluminum, zinc, and lithium) salts of higher fatty acids such as stearic acid and lauric acid, resins such as polyethylene wax and polyethylene powder, and polyalkylene glycols such as polyethylene glycol, polypropylene glycol or their salts. These dispersing agents can be used in combination with each other, or with extenders and modifiers.

If the amount of the coloring matters having a Mohs hardness of 3.5 or more is in excess of the above-defined limit, the mechanical strength undesirably drops.

The Mohs hardness of coloring matters in the component (e) dispersed in the composition of the present invention is measured by procedures commonly employed such as a method in which the composition is extracted with an organic solvent to separate the components; for example, the composition is dissolved in xylene at 140 to 150° C. for 1 to 2 hours and, thereafter, the coloring component, filler and resin are separated by the use of a cylindrical filter, and a method in which the composition is burned to separate the filler and coloring component and, thereafter, the coloring component is separated from the filler and weighed.

The resin composition of the present invention comprises:

(a) 30 to 98 parts by weight, preferably 40 to 95 parts by weight of a crystalline propylene polymer;

(b) 2 to 30 parts by weight, preferably 3 to 25 parts by weight of a specific glass fiber;

(c) 0 to 35 parts by weight of an ethylene copolymer rubber;

(d) 0 to 30 parts by weight of an inorganic filler; and (e) 0 to 10 parts by weight per 100 parts by weight the sum of the components (a) to (d) of a pigment.

In a preferred embodiment using components (c), (d) and (e), the resin composition of the present invention comprises:

(a) 30 to 98 parts by weight of a crystalline propylene polymer;

(b) 2 to 30 parts by weight of a specific glass fiber;

(c) 5 to 25 parts by weight of an ethylene copolymer rubber;

(d) 5 to 25 parts by weight of an inorganic filler; and (e) 0.01 to 10 parts by weight per 100 parts by weight of the sum of the components (a) to (d) of a pigment.

If the proportion of the component (a) is less than 30 parts by weight, the resulting composition is poor in moldability, whereas if it is in excess of 98 parts by weight, the effect of the present invention cannot be expected to be obtained. If the proportion of the component (b) is less than 2 parts by weight, the resulting composition is dificient in high temperature stiffness, whereas if it is in excess of 30 parts by weight, the appearance is deteriorated. If the proportion of the componenet (c) is in excess of 35% by weight, the high temperature stiffness seriously drops. If the proportion of the component (d) is in excess of 30 parts by weight, the appearance of the molded article is reduced and the impact strength is also reduced. If the proportion of the component (e) is in excess of 10 parts by weight, a reduction in physical properties due to a dispersing agent and the like occurs, and addition of the component (e) in such large amounts is disadvantageous from an economic standpoint.

If the proportion of the component (c) is within the range of from 7 to 20 parts by weight, the resulting composition is superior in impact strength, amount of warp, and dimensional stability. If the component (d) is added in a proportion ranging between 5 and 20 parts by weight, there can be obtained a composition in which the high temperature stiffness, warp, and dimensional stability are well balanced. If the component (e) is added in a proportion ranging between 0.1 and 5 parts by weight per 100 parts by weight of the sum of the components (a) to (d), there can be obtained a composition in which the appearance, scratch resistance, and mechanical strength are well balanced.

As well as the components (a) to (e), the resin composition of the present invention may contain other components within the range that does not seriously deteriorate the effect of the present invention (usually 30% by weight or less based on the total weight of the composition).

Components which can be added to the resin composition of the present invention are shown below.

Organic or inorganic fillers, subjected or not subjected to a surface treatment, except for the components (b) and (d), such as calcium carbonate (heavy, light, or colloidal), barium sulfate, clay, magnesium carbonate, alumina, silica, calcium sulfate, glass beads, hollow glass beads, siliceous sand, silica stone, carbon black, aluminum hydroxide, magnesium hydroxide, zinc oxide, basic magnesium carbonate, asbestos, zeolite, molybdenum, diatomaceous earth, sericite, schirrus, graphite, calcium hydroxide, calcium sulfite, gypsum fiber, carbon fiber, synthetic silicic acid-based fibers (e.g., processed mineral fiber (PMF)), silica powder, bentonite, metallic whisker, wood powder, and sodium sulfate;

Modified or unmodified rubbers or latexes, except for the component (c), such as a styrene-butadiene rubber, 1,2-polybutadiene, butyl rubber, a styrene-butadiene-styrene block copolymer or its hydrogenated product, a nitrilebutadiene rubber, polyisobutylene, polybutadiene, and polyisoprene;

thermoplastic resins except for the component (a), such as homopolymers of α-olefins (e.g., high-, mediate- or low-density polyethylene and polybutene, excluding polypropylene), copolymer of α-olefins except for propylene, and copolymers of α-olefins except for propylene and vinyl monomers (e.g., an ethylene-vinyl acetate copolymer and a maleic anhydride-grafted polyethylene), and other resins except for the olefin polymers (e.g., polyamide, polycarbonate, an acrylonitrile-butadiene-styrene resin (ABS), polysulfone, polyvinyl chloride, and polyphenylene oxide);

thermosetting resins;

antioxidants (e.g., phenol- and sulfur-group antioxidants);

lubricants;

coloring matters except for the component (e):
ultraviolet absorbers;

antistatic agents;
dispersing agents;
metal deactivator;
neutralizing agents;
foaming agents;
plasticizers;
defoaming agents;
flame-retardants;
cross-linking agents;
flowability-improving agents;
weld strength-improving agents;
coatability improving agents;
light stabilizers; and
nucleators.

These compounds can be used in combination with each other.

The composition of the present invention can be prepared by the use of commonly used kneaders such as a single screw extruder, twin screw extruder, a Banbury mixer, a roll, and a kneader.

The resin composition of the present invention can be prepared in any suitable manner. For example, the component (a) and a major portion of each of the components (b), (c), (d) and (e) are compounded and granulated by the use of, e.g., twin screw extruder and, thereafter, the remainder of each of the components (b), (c), (d) and (e) are added and the resulting mixture is granulated by the use of, e.g., single screw extruder.

Usually the components (a) to (e) are kneaded in, e.g., an extruder, shaped into pellet form, and then used in molding. In a special embodiment, the components (a) to (e) can be kneaded independently from each other or after kneading in advance, fed directly to various types of extruders, and molded. Furthermore, the components (b) to (e) are kneaded into component (a) in high concentrations, singly or after partially blending, to prepare the corresponding master batches and, thereafter, the master batch is blended or compounded while diluting with the component (a) or (c) and molded. Moreover, for example, the component (b) in roving form can be supplied continuously through the vent pores or die portion of the extruder to achieve compounding.

The resin composition of the present invention can be processed by known techniques such as extrusion, blow molding, injection molding, sheet extrusion, thermoforming, rotary molding, and lamination; that is, the effect of the present invention can be obtained irrespective of the type of processing technique. For a composition of relatively low melt flow rate (MFR), extrusion is suitable, and for a composition of relatively high melt flow rate (MFR), injection mold,ing is suitable.

The resin composition of the present invention is superior to conventional glass fiber reinforced propylene polymer resin compositions in a high balance between high temperature stiffness and appearance, pelletizability, amount of warp or re-heating warp, and impact strength and, furthermore, is satisfactory in, for example, scratch resistance, printing properties, painting properties, tapping properties, and moldability.

The present invention is described in detail with reference to the following examples.

EXAMPLE 1

The testing methods as used herein were as follows:
(1) High Temperature Stiffness (Flexural Modulus at 100° C.)
Measured according to JIS-K7203.

(2) Appearance (Formation of Silver Streaks)
A disk-like specimen (diameter: 200 mm; thickness: 2 mm; gate: pin point of diameter 1 mm) was prepared by injection molding, and the formation of silver streaks was examined with the naked eye. (3) Warp The same disk-like specimen as used in (1) above was placed in an atmosphere of 23° C. and 50% RH for 72 hours and then placed on a flat plate. The maximum amount of distortion was measured by the use of a slide calipers and indicated as an amount of warp. Molded articles having an amount of warp of 10 mm or less are particularly suitable for practical use. (4) Re-heating Warp The specimen of (3) above was placed in a hot air oven maintained at 100° C. for 5 hours and subsequently allowed to stand in a room of 23° C. and 50% RH for 24 hours. The amount of warp was measured in the same manner as in (3) and the amount of re-heating warp was calculated by the following equation:

$$\text{Amount of re-heating warp} = \left| \text{Amount of warp} - \text{Amount of warp after heat treatment} \right|$$

Molded articles having an amount of re-heating warp of 5 mm or less are particularly suitable for practical use.

(5) Impact Strength (Notched Izod Impact Strength)
Measured according to JIS-K7110 (atmosphere temperature: 23° C.).

Component (a):
a propylene-ethylene block copolymer (I.I.: 98; ethylene content: 6% by weight: MFR: 7 g/10 min);
polypropylene (I.I.: 99; MFR: 4g/10 min);
acrylic acid-modified polypropylene (amount of the modifying agent: 6.5% by weight); and
maleic anhydride-modified polypropylene (amount of the modifying agent: 0.9% by weight).

Component (b):
Glass fiber with an average diameter of 4μ (amount of the binder deposited: 0.12% by weight); and
glass fiber with an average diameter of 6μ (amount of the binder deposited: 0.15% by weight).

For both the glass fibers, the fiber length was 3 mm, the number of fibers bundled was 1,000, the surface-treating component was a γ-aminopropyl-based silane, and the binder was composed of a surface active agent, a lubricant, a softening agent, an antistatic agent, a film-forming agent, etc., the ratio of the surface-treating component to the binder being 50:50.

Component (c):
an ethylene-propylene copolymer rubber (ethylene content: 49% by weight; Mooney viscosity, $ML_{1+4}$ (100° C.):
an ethylene-butene-1 copolymer rubber (ethylene content: 78% by weight: Mooney viscosity, $ML1+4$ (100° C.): 20).

Component (d):
talc having an average particle size of 1.5μ;
mica (muscovite) having an average particle size of 8μ; and
milled fiber having an average diameter of 10μ and a length of 150μ.

Other ingredients:
a phenol-group antioxidant (0.1 part by weight); and
a sulfur-group antioxidant (0.1 part by weight).

These compounds were compounded in proportions as shown in Table 1 and mixed in a powder mixer for 2 minutes. The mixture was kneaded and granulated at 230° C. by the use of a vented single screw extruder (diameter: 65 mm). Thereafter, it was molded by the use of a screw-in-line injection molding machine to prepare a disk-like specimen and a specimen for the measurement of physical properties. The specimen was measured for high temperature stiffness, appearance, amount of warp, amount of re-heating warp, and impact strength. The results are shown in Table 1 (Nos. 1 to 9). It can be seen that for all the composition, the high temperature stiffness and appearance are well balanced, the amount of warp or re-heating warp is small, and the impact strength is satisfactory.

A composition (No. 5 as shown in Table 1) was molded by the use of a Mitsubishi Natoko 800 Model EXL screw-in-line injection molding machine to produce a plate (width: 300 mm; length: 600 mm; thickness: 3 mm), which was expected to be used as a large-sized car part, such as an instrument panel, a console, and a trim, or a home electric appliance part such as a part for air conditioners or television sets. In this molding process, moldability and fluidity were good, and a characteristic silver streak-like flow pattern was not almost observed in the surface of the plate; that is, the plate had a good appearance. The plate had sufficiently satisfactory high temperature stiffness, dimensional stability and impact strength (Izod, falling ball impact) for use as car part, or a home electric appliance part. Furthermore, it was good in respect of scratch resistance, weld strength, creep resistance, heat distortion properties, coating properties, and so forth, and no serious sink and warp were observed.

COMPARATIVE EXAMPLE 1

As well as the same propylene-ethylene block copolymer, acrylic acid-modified propylene polymer, ethylene-propylene copolymer rubber, talc, and antioxidant as used in Example 1, as the component (b), a glass fiber having an average diameter of $13\mu$ and an amount of the binder deposited of 0.55% by weight or a glass fiber having an average diameter of $13\mu$ and an amount of the binder deposited of 0.14% by weight, or a glass fiber having an average diameter of $6\mu$ and an amount of the binder deposited of 0.72% by weight (for all the glass fibers, the fiber length, number of fibers bundled, type of each of the surface-treating component and binder component, and the ratio of the surface-treatment component to the binder component are the same as in Example 1) was used. They were mixed in proportions shown in Table 1 (Nos. 10 to 15) and molded in the same manner as in Example 1 For all the molded articles, the balance between the high temperature stiffness and appearance was poor. That is, when the glass fiber having an average diameter in excess of $10\mu$ was used, the high temperature stiffness was low, and when the amount of the binder deposited was in excess of 0.3% by weight, the appearance was not good. Also, when there was used a glass fiber in which the average diameter was in excess of $10\mu$ and the amount of the binder deposited was in excess of 0.3% by weight, the resulting article was inferior in both the performances.

TABLE 1

| | Composition (parts by weight) | | | | | | | | |
|---|---|---|---|---|---|---|---|---|---|
| | Propylene Polymer (a) | | Modified Polypropylene (a) | | Glass Fiber (b) | | | Ethylene Based Rubber (c) | |
| Run No. | Type | Amount | Modifying Monomer | Amount | Average Diameter ($\mu$) | Amount of Converging Agent Deposited (wt %) | Amount | Type | Amount |
| 1 | EEP | 85 | Acrylic Acid | 5 | 6 | 0.15 | 10 | — | — |
| 2 | " | 75 | " | 5 | " | " | 20 | — | — |
| 3 | " | 75 | " | 5 | 4 | 0.12 | 20 | — | — |
| 4 | " | 80 | — | 0 | 6 | 0.15 | 20 | — | — |
| 5 | " | 65 | Acrylic Acid | 5 | " | " | 20 | EP Rubber | 10 |
| 6 | " | 55 | " | 5 | " | " | 10 | " | 10 |
| 7 | " | 65 | " | 5 | " | " | 10 | — | — |
| 8 | " | 56 | Maleic Anhydride | 4 | " | " | 15 | EP Rubber | 10 |
| 9 | PP | 61 | Maleic Anhydride | 4 | " | " | 15 | EB Rubber | 10 |
| 10 | EPP | 75 | Acrylic Acid | 5 | 13 | 0.55 | 20 | — | — |
| 11 | " | 75 | " | 5 | " | 0.14 | 20 | — | — |
| 12 | " | 75 | " | 5 | 6 | 0.72 | 20 | — | — |
| 13 | " | 65 | " | 5 | 13 | 0.55 | 20 | EP Rubber | 10 |
| 14 | " | 65 | " | 5 | 6 | 0.72 | 20 | " | 10 |
| 15 | " | 55 | " | 5 | 13 | 0.55 | 10 | " | 10 |

| | Composition (parts by weight) | | Evaluation | | | | |
|---|---|---|---|---|---|---|---|
| | Inorganic Filler (d) | | H.T.S.* (100° C.) | | | Izod Impact Strength | Re-heating Warp |
| Run No. | Type | Amount | (kg/cm²) | Appearance | Warp (mm) | (kg · cm/cm) | (mm) |
| 1 | — | — | 13,100 | Good | | 8 | |
| 2 | — | — | 21,400 | " | 9.5 | 10 | 4 |
| 3 | — | — | 22,200 | " | 6 | 11 | 3 |
| 4 | — | — | 17,800 | " | | 9 | |
| 5 | — | — | 15,300 | " | 8 | 14 | 3 |
| 6 | Talc | 20 | 14,600 | " | 6 | 9 | 3 |
| 7 | Mica | 20 | 19,200 | " | 7 | 6 | |
| 8 | Milled Fiber | 15 | 14,400 | " | 6 | 8 | 3 |
| 9 | Mica | 10 | 16,200 | " | | " | |
| 10 | — | — | 17,200 | Bad | 13 | 7 | 7 |
| 11 | — | — | 17,400 | Good | 12.5 | 8 | 6.5 |
| 12 | — | — | 21,200 | Bad | | 10 | |
| 13 | — | — | 12,300 | " | 10 | 12 | 5 |
| 14 | — | — | 14,800 | " | | 13 | |

TABLE 1-continued

| 15 | Talc | 20 | 11,700 | " | 9 | 7 | 4 |

Run Nos. 10–15 are comparative examples
EPP: Propylene-ethylene block copolymer
PP: Polypropylene
EP Rubber: Ethylene-propylene copolymer rubber
EB Rubber: Ethylene-butene-1 copolymer rubber
*H.T.S.: High Temperatures Stiffness

EXAMPLE 2

The testing methods as used herein were as follows:

(1) High Temperature Stiffness (Flexural Modulus at 90° C.)

Measured according to JIS-K7203.

(2) Impact Strength

A test specimen (100 mm×100 mm×2 mm) was placed on a support with a hole of diameter of 40 mm, and a dart as a load sensor was dropped on the test specimen (1 m×6 kg f). The behavior of distortion or fracture of the test specimen at a given impact load was measured. The impact energy absorbed prior to the formation of cracks in the above-obtained impact pattern was calculated, which was define.d as an impact strength of the material. The measurement was performed at 23° C.

(3) Pelletizability

Each composition was granulated by the use of a single screw extruder (diameter: 40 mm) manufactured by Mitsubishi Heavy Industry Co., Ltd., under conditions of temperature 230° C. and number of rotation of screw 60 rpm. At the time of molding, material feedability, the state of extrusion of strands (formation of surge), the appearance of strands, the extrusion amount, and so forth were collectively examined, and pelletizability was rated as follows: (1) better, (2) good, and (3) bad.

(4) Appearance (Degree of Coloration, Formation of Silver Streaks, etc.)

A disk-like test specimen (diameter: 200 mm; thickness: 2 mm; gate: pin point of diameter 1 mm) was prepared, and visual examination was performed to determine the degree of coloration, the formation of silver streaks, and so forth. The rating was performed as follows:

1. . . . The coloration is good and almost no silver streak is observed.

2. . . . The coloration is good and silver streaks are observed only in the neighbourhood of the gate.

3. . . . Irregularities in coloration, indistinctness in coloration, or the formation of silver streaks is marked to an extent that is unsuitable for practical use.

(5) Warp (Warp, Re-heating Warp)

The disk-like specimen of (4) above was allowed to stand for 72 hours in an atmosphere of 23° C. and 50% RH and then placed on a flat plate. The maximum amount of distortion was measured as an amount of warp by the use of a slide calipers. Molded articles having an amount of warp of 10 mm or less are especially preferred for practical use.

The same specimen as above was placed in a hot air oven at 90° C. for 5 hours and subsequently allowed to stand in a room of 23° C. and 50% RH for 24 hours. The amount of warp was measured by the same method as described above, and the amount of re-heating warp was calculated from the following equation:

$$\text{Amount of re-heating warp} = \left| \text{Amount of warp} - \text{Amount of warp after heat treatment} \right|$$

Molded articles having an amount of re-heating warp of 5 mm or less are especially suitable for practical use.

In addition to the components (a) to (e) as shown in Table 2 (the component (d): same talc as used in Example 1), a phenol-group antioxidant and sulfur-group antioxidant were each added in an amount of 0.1% by weight. The resulting composition was kneaded and granulated at 230° C. by the use of a vented single screw extruder (diameter: 40 mm) to determine pelletizability. Thereafter, a test specimen for evaluation of physical properties and a disk-like test specimen were molded by the use of a screw-in-line injection machine and evaluated. The results are shown in Table 2.

Compositions Nos. 16, 17, 18, 23, 24, 26 and 27 showed well balanced quality. That is, pelletizability was good, the mechanical strength was high, and the amount of warp was small. Composition No. 17 was molded into a plate (width: 300 mm; length: 600 mm; tickness: 3 mm) which was expected to use as an industrial part. Moldability was good. The plate was satisfactory in appearance, was free from problems such as sink and warp, had physical properties satisfactory for industrial use, and was good in painting properties and scratch resistance. On the other hand, in the case of compositions Nos. 19 to 22 and 25, the balance of quality was not good. That is, pelletizability was poor, the amount of warp was too large, the mechanical strength was low, and the appearance was bad.

The components (a) to (e) as used herein were as follows:

Component (a):

| Type | MFR (g/10 min) | $C_2$ Content (wt %) | Cold Xylene-Soluble Portion | | Unsaturated Organic Acid | |
|------|----------------|----------------------|------------------------------|------|-------------------------|-----|
|      |                |                      | $C_2$ Content (wt %) | wt % | Type | Amount of Modification (wt %) |
| $A_1$ | 6  | 5 | 29 | 16 | Maleic anhydride | 0.02 |
| $B_1$ | 12 | 9 | 26 | 22 | Acrylic acid | 1.21 |
| $C_1$ | 10 | 8 | 33 | 19 | — | — |
| $D_1$ | 9  | 7 | 65 | 15 | — | — |

Note:
All were propylene-ethylene block copolymers

Component (b): Glass Fiber

| Type | Average Diameter ($\mu$) | Amount of Binder Deposited (wt %) |
|---|---|---|
| $A_2$ | 9 | 0.16 |
| $B_2$ | 6 | 0.21 |
| $C_2$ | 6 | 0.85 |
| $D_2$ | 9 | 0.71 |
| $E_2$ | 13 | 0.55 |

Component (c): Ethylene Copolymer Rubber $A_3$ . . . Ethylene-propylene rubber (EPR) having a Mooney viscosity of 70 and an ethylene content of 75% by weight.

$B_3$ . . . EPR having a Mooney viscosity of 23 and an ethylene content of 73% by weight.

Component (d): Filler

Talc having an average particle size of 1.8$\mu$.

Component (e): Pigment

Gray pigment (Gray A) . Gray pigment prepared by mixing zinc oxide, carbon black, titanium oxide, and aluminum stearate (dispersing agent) (the proportion of the matter having a Mohs hardness of 3.5 or more in the coloring matter; that is, the proportion of titanium oxide: 2% by weight)

Gray pigment (Gray B) . Gray pigment prepared by mixing titanium oxide, zinc sulfide, iron black, carbon black, white carbon, and a dispersing agent (the proportion of the matters having a Mohs hardness of 3.5 or more in the coloring matter; that is, the proportion of titanium oxide, iron black, and white carbon: 45% by weight)

Brown Pigment (Brown A) . Brown pigment prepared by mixing Benzidine Yellow, Quinacridone Red, zinc sulfide, and carbon black (not containing a matter having a Mohs hardness of 3.5 or more)

Brown pigment (Brown B) . Brown pigment prepared by mixing yellow iron oxide, Isoindolenone Yellow, iron oxide red, Perylene Red, titanium oxide, iron black, carbon black, and a dispersing agent (the proportion of the components having a Mohs hardness of 3.5 or more: that is, the proportion of yellow iron oxide, iron oxide red, titanium oxide and iron black: 38% by weight)

Blue pigment (Blue) . Blue pigment prepared by mixing Phthalocyanine Blue, titanium oxide, Aniline Black, zinc oxide, and a dispersing agent (the proportion of the matter having a Mohs hardness of 3.5 more; the proportion of titanium oxide: 1% by weight)

TABLE 2

| | Composition (parts by weight) | | | | | | | | |
|---|---|---|---|---|---|---|---|---|---|
| | Propylene Polymer (a) | | Glass Fiber (b) | | Ethylene Copolymer Rubber (c) | | Talc (d) | Pigment (e) | |
| Run No. | Type | Amount | Type | Amount | Type | Amount | Amount | Type | Amount |
| 16 | $A_1$ | 75 | $A_2$ | 25 | — | — | — | Gray A | 1.0 |
| 17 | $B_1$ / $C_1$ | 5 / 62 | $B_2$ | 25 | $A_3$ | 8 | — | Brown A | 1.5 |
| 18 | $B_1$ / $C_1$ | 5 / 50 | $A_2$ / $B_2$ | 15 / 15 | $B_3$ | 15 | — | Blue | 3.0 |
| 19 | $D_1$ | 67 | $C_2$ | 25 | $A_3$ | 8 | — | Brown A | 1.5 |
| 20 | $B_1$ / $C_1$ | 5 / 62 | $B_2$ | 25 | $A_3$ | 8 | — | Brown B | 1.5 |
| 21 | $A_1$ | 75 | $D_2$ | 25 | — | — | — | Gray B | 1.0 |
| 22 | $B_1$ / $C_1$ | 5 / 62 | $E_2$ | 25 | $A_3$ | 8 | — | Brown A | 1.5 |
| 23 | $A_1$ | 75 | $A_2$ | 25 | — | — | — | — | — |
| 24 | $B_1$ / $C_1$ | 5 / 62 | $B_2$ | 25 | $A_3$ | 8 | — | — | — |
| 25 | $B_1$ / $C_1$ | 5 / 62 | $E_2$ | 25 | $A_3$ | 8 | — | — | — |
| 26 | $A_1$ | 85 | $A_2$ | 15 | — | — | — | Brown A | 1.5 |
| 27 | $B_1$ / $C_1$ | 5 / 55 | $A_2$ | 20 | $B_3$ | 10 | 10 | Gray-A | 1.0 |

| Run No. | Flexural Modulus (90° C.) (kg/cm$^2$) | Impact Strength (dart) (kg/cm) | Pelletizability | Appearance | Amount of Warp | |
|---|---|---|---|---|---|---|
| | | | | | Warp (mm) | Re-heating Warp (mm) |
| 16 | 27,200 | 16 | Better | 1 | 8 | 4 |
| 17 | 22,500 | 19 | Good | 1-2 | 7 | 3.5 |
| 18 | 23,100 | 18 | Better | 1-2 | 6.5 | 3 |
| 19 | 19,900 | 21 | Bad | 3 | — | — |
| 20 | 20,100 | 6 | Good | 1-2 | 11 | 6 |
| 21 | 25,800 | 5 | Bad | 3 | 12 | 7.5 |
| 22 | 17,000 | 20 | Good | 3 | 13.5 | 7 |
| 23 | 27,600 | 17 | Better | 1* | 8 | 4 |
| 24 | 22,900 | 19 | Good | 1-2* | 7.5 | 3.5 |
| 25 | 17,200 | 19 | Good | 3* | 14 | 7 |
| 26 | 19,700 | 11 | Better | 1 | 9 | 4.5 |

TABLE 2-continued

| 27 | 21,600 | 17 | Good | 1-2 | 6 | 3 |

*Excluded the degree of coloration

While the invention has been described in detail and with reference to specific embodiment thereof, it will be apparent to one skilled in the art that various changes and modifications can be made therein without departing from the spirit and scope thereof.

What is claimed is:

1. A glass fiber reinforced resin compsition comprising the following components (a) to (e):
   (a) 30 to 98 parts by weight of a crystalline propylene polymer having an isotactic index of at least 40 and a melt flow rate of about 0.01 to about 200 g/10 minutes;
   (b) 2 to 30 parts by weight of a glass fiber having an average diameter of $10\mu$ or less and an amount of a binder deposited on the surface of the glass fiber of 0.01 to 0.3% by weight, the binder containing a film-forming agent;
   (c) 0 to 35 parts by weight of an ethylene copolymer rubber;
   (d) 0 to 35 parts by weight of at least one inorganic filler aelected from the group consisting of talc, mica, calcium silicate. and glass powder;
   (e) 0.01 to 10 parts by weight per 100 parts by weight of the sum of the components a to d of a pigment in which coloring matters having a Mohs hardness of 3.5 of or more constitute less than 15% by weight of the coloring component excluding the dispersing component.

2. The glass fiber reinforced resin composition as claimed in claim 1, wherein the crystalline propylene polymer is a polypropylene or a propylene-ethylene random ck copolymer.

3. The glass fiber reinforced resin compsosition as claimed in claim 1, wherein the crystalline propylene polymer is a propylene-ethylene block copolymer in which the ethylene content is from 1 to 25% by weight, the cold xylene-soluble portion ccntent is from 3 to 30% by weight, and the ethylene content of the cold xylene-soluble portion is 20 to 60% by weight.

4. The glass fiber reinforced resin composition as claimed in claim 1, wherein the crystalline propylene polymer is a propylene-ethylene block copolymer in which the ethylene content is from 2 to 20% by weight, cold xylene-soluble portion content is from 4 to 25% by weight, and the ethylene content of the cold xylene-soluble portion is from 25 to 50% by weight.

5. The glass fiber reinforced composition as claimed in claim 1, wherein the crystalline propylene polymer is a modified propylene polymer which is at least partially modified with a modifying agent selected from the group consisting of an unsaturated organic acid and its derivatives, the amount of the modifying agent being 0.01 to 20% by weight based on the weight of the crystalline propylene polymer.

6. The glass fiber reinforced composition as claimed in claim 5, wherein the crystalline propylene polymer is a polypropylene or a propylene-ethylene random or block copolymer.

7. The glass fiber reinforced composition as claimed in claim 5, wherein the crystalline propylene polymer is a propylene-ethylene block copolymer in which the ethylene content is from 1 to 25% by weight, the cold xylene-soluble portion content is from 3 to 30% by weight, and the ethylene content of the cold xylene-soluble portion is 20 to 60% by weight.

8. The glass fiber reinforced composition as claimed in claim 5, wherein the crystalline propylene polymer is a propylene-ethylene block copolymer in which the ethylene content is from 2 to 20% by weight, cold xylene-soluble portion content is from 4 to 25% by weight, and the ethylene content of the cold xylene-soluble portion is from 25 to 50% by weight.

9. The glass fiber reinforced composition as claimed in claim 5, wherein the modifying agent is acrylic acid or maleic anhydride.

10. The glass fiber reinforced composition as claimed in claim 5, wherein the modified propylene polymer is composed of a mixture of one or more modified propylene polymers and one or more unmodified propylene polymers.

11. The glass fiber reinforced composition as claimed in claim 1, wherein the average diameter of the glass fiber is $9\mu$ or less.

12. The glass fiber reinforced composition as claimed in claim 1, wherein the average diameter of the glass fiber is $7\mu$ or less.

13. The glass fiber reinforced composition as claimed in claim 1, wherein the ethylene copolymer rubber has an ethylene content of from 90 to 40% by weight and a Mooney viscosity, $ML_{1+4}$ (100° C.), of from about 5 to 120.

14. The glass fiber reinforced composition as claimed in claim 1, wherein the inorganic filler is talc having an average particle size of from 0.2 to $10\mu$.

15. The glass fiber reinforced composition as claimed in claim 1, wherein the inorganic filler is talc having an average particle size of from 0.2 to $5\mu$.

16. The glass fiber reinforced composition as claimed in claim 1, wherein the inorganic filler is mica having an average particle size of from 1 to $150\mu$.

17. The glass fiber reinforced composition as claimed in claim 1, wherein the inorganic filler is mica having an average particle size of from 2 to $50\mu$.

18. The glass fiber reinforced composition as claimed in claim 1, wherein the inorganic filler is white mica.

19. The glass fiber reinforced composition as claimed in claim 1, wherein the inorganic filler is calcium silicate having an average particle size of from 1 to $15\mu$.

20. The glass fiber reinforced composition as claimed in claim 19, wherein calcium silicate has an average particle size of from 2 to $10\mu$.

21. The glass fiber reinforced composition as claimed in claim 1, wherein the inorganic filler is glass powder having an average particle diameter of $13\mu$ or less and a length of from 5 to $300\mu$.

22. The glass fiber reinforced composition as claimed in claim 1, wherein the coloring matters having a Mohs hardness of 3.5 or more constitute less than 15% by weight of the coloring component (excluding the dispersing component).

23. The glass fiber reinforced composition as claimed in claim 1, wherein the coloring matters having a Mohs hardness of 3.5 or more constitute less than 5% by weight of the coloring component (excluding the dispersing component).

24. The glass fiber reinforced composition as claimed in claim 1, wherein the composition comprises from 40 to 95 parts by weight of the crystalline propylene polymer and from 3 to 25 parts by weight of the glass fiber.

25. The glass fiber reinforced composition as claimed in claim 1, wherein the composition comprises from 5 to 25 parts by weight of the ethylene copolymer rubber.

26. The glass fiber reinforced composition as claimed in claim 1, wherein the composition comprises from 5 to 25 parts by weight of the inorganic filler.

27. The glass fiber reinforced composition as claimed in claim 1, wherein the composition comprises from 0.01 to 10 parts by weight, per 100 parts by weight of the sum of the components (a), (b) and (c), of a pigment.

28. The glass fiber reinforced composition as claimed in claim 1, wherein the composition comprises from 7 to 20 parts by weight of the ethylene copolymer rubber.

29. The glass fiber reinforced composition as claimed in claim 1, wherein the composition comprises from 5 to 20 parts by weight of the inorganic filler.

30. The glass fiber reinforced composition as claimed in claim 1, wherein the composition comprises from 0.1 to 5 parts by weight, per 100 parts by weight of the sum of the components (a) to (d), of the pigment.

31. The glass fiber reinforced composition as claimed in claim 1, wherein the film forming agent comprises a modified or unmodified polyolefin.

* * * * *

UNITED STATES PATENT AND TRADEMARK OFFICE
CERTIFICATE OF CORRECTION

PATENT NO. : 4,603,153

DATED : July 29, 1986

INVENTOR(S) : Yoshihiro Sobajima et al

It is certified that error appears in the above-identified patent and that said Letters Patent is hereby corrected as shown below:

Claim 1, subparagraph (d), line 1, change "0 to 35 parts" to -- 0 to 30 parts --; subparagraph (d), line 2, change "aelected" to -- selected --.

Signed and Sealed this

Tenth Day of March, 1987

*Attest:*

DONALD J. QUIGG

*Attesting Officer*  *Commissioner of Patents and Trademarks*